(12) United States Patent
Bruton et al.

(10) Patent No.: US 12,365,990 B2
(45) Date of Patent: Jul. 22, 2025

(54) COLD SPRAYED ELECTRICAL CIRCUITS AND METHODS THEREOF

(71) Applicant: The Boeing Company, Chicago, IL (US)

(72) Inventors: Eric Alan Bruton, Lake St. Louis, MO (US); Stephen P. Gaydos, St. Louis, MO (US); Andrew Michael Zweig, Chesterfield, MO (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/653,333

(22) Filed: Mar. 3, 2022

(65) Prior Publication Data

US 2023/0279554 A1    Sep. 7, 2023

(51) Int. Cl.
  *C23C 24/04* (2006.01)
  *B05B 7/16* (2006.01)
  (Continued)

(52) U.S. Cl.
  CPC .............. *C23C 24/04* (2013.01); *B05B 7/164* (2013.01); *B32B 15/04* (2013.01); *B32B 15/08* (2013.01);
  (Continued)

(58) Field of Classification Search
  CPC ......... C23C 24/04; B05B 7/164; B32B 15/04; B32B 15/08; B32B 15/18; B32B 15/20; B32B 27/06; B32B 27/08; B05D 2201/00
  (Continued)

(56) References Cited

U.S. PATENT DOCUMENTS

| | | | |
|---|---|---|---|
| 4,390,489 A | | 6/1983 | Segal |
| 4,769,270 A | * | 9/1988 | Nagamatsu ............ H05K 1/056 |
| | | | 428/209 |

(Continued)

FOREIGN PATENT DOCUMENTS

| | | |
|---|---|---|
| EP | 3401419 A1 | 11/2018 |
| WO | 2019148162 A1 | 8/2019 |

OTHER PUBLICATIONS

Thermcraft, "Electrical Resistance Heating Elements: An Overview", 2016, p. 1 (Year: 2016).*

(Continued)

*Primary Examiner* — Callie E Shosho
*Assistant Examiner* — Steven A Rice
(74) *Attorney, Agent, or Firm* — MH2 Technology Law Group LLP (57) ABSTRACT

The present disclosure relates to a cold spray metal process for providing an electrical connection within a multilayered composite article. The present disclosure relates to a cold sprayed metal coated article or a structural component having a polymeric composite material having at least one surface, a thermoplastic electrochemical insulating layer on the at least one surface, an electrical circuit may include a cold sprayed metal coating present on at least a portion of a surface of the electrochemical insulating layer, and at least one additional layer, the at least one additional layer encapsulating at least a portion of the cold sprayed metal between the additional layer and the electrochemical insulating layer. The structural component may include a cold sprayed metal coating having one or more non-continuous segments, where the one or more non-continuous segments are not in lateral contact with one another.

22 Claims, 8 Drawing Sheets

(51) Int. Cl.
  *B32B 15/04* (2006.01)
  *B32B 15/08* (2006.01)
  *B32B 15/18* (2006.01)
  *B32B 15/20* (2006.01)
  *B32B 27/06* (2006.01)
  *B32B 27/08* (2006.01)

(52) U.S. Cl.
  CPC .............. *B32B 15/18* (2013.01); *B32B 15/20* (2013.01); *B32B 27/06* (2013.01); *B32B 27/08* (2013.01); *B05D 2201/00* (2013.01)

(58) Field of Classification Search
  USPC .......................................................... 428/457
  See application file for complete search history.

(56) References Cited

U.S. PATENT DOCUMENTS

| | | | |
|---|---|---|---|
| 5,127,601 A | 7/1992 | Schroeder | |
| 5,246,538 A | 9/1993 | Johnson | |
| 5,302,414 A | 4/1994 | Alkhimov et al. | |
| 6,129,948 A | 10/2000 | Plummer et al. | |
| 7,354,354 B2 | 4/2008 | Palumbo et al. | |
| 8,119,531 B1 | 2/2012 | Arnold | |
| 2004/0058064 A1 | 3/2004 | Fuller et al. | |
| 2006/0093736 A1 | 5/2006 | Raybould et al. | |
| 2006/0135282 A1 | 6/2006 | Palumbo et al. | |
| 2007/0175573 A1 | 8/2007 | Fox et al. | |
| 2008/0145555 A1 | 6/2008 | Kocik et al. | |
| 2009/0029180 A1 | 1/2009 | Oguri et al. | |
| 2010/0040902 A1 | 2/2010 | Mizrahi | |
| 2010/0119707 A1 | 5/2010 | Raybould et al. | |
| 2010/0304063 A1 | 12/2010 | McCrea et al. | |
| 2011/0039024 A1 | 2/2011 | Jabado | |
| 2011/0135884 A1 | 6/2011 | Lettow | |
| 2011/0159764 A1 | 6/2011 | Price et al. | |
| 2012/0037449 A1 | 2/2012 | Ayle | |
| 2012/0125660 A1* | 5/2012 | Bright | C03C 17/366 427/108 |
| 2013/0001211 A1* | 1/2013 | Lewis | H05B 3/36 219/201 |
| 2013/0095340 A1 | 4/2013 | Sivakumar et al. | |
| 2014/0141257 A1 | 5/2014 | Ranade et al. | |
| 2017/0165906 A1 | 6/2017 | Alms et al. | |
| 2018/0186460 A1* | 7/2018 | Dardona | H05B 3/262 |
| 2018/0233981 A1* | 8/2018 | Yin | H02K 3/345 |
| 2018/0327911 A1 | 11/2018 | Rack | |
| 2019/0233946 A1 | 8/2019 | Bruton | |
| 2020/0032010 A1 | 1/2020 | Liao et al. | |
| 2020/0399763 A1 | 12/2020 | Bruton | |
| 2021/0031929 A1* | 2/2021 | Goodfellow Jones | H05B 3/18 |
| 2021/0176904 A1* | 6/2021 | Su | B32B 37/025 |
| 2023/0047638 A1 | 2/2023 | Bruton et al. | |
| 2023/0050236 A1* | 2/2023 | Chen | C09D 109/06 |
| 2023/0086889 A1 | 3/2023 | Bruton et al. | |
| 2023/0212756 A1 | 7/2023 | Bruton et al. | |

OTHER PUBLICATIONS

Dielectric Manufacturing, "Kapton (R) (Unfilled Polyimide)", Apr. 1, 2023 (Year: 2023).*
Notification Concerning Transmittal of International Preliminary Report on Patentability mailed Aug. 13, 2020 in correspondeing PCT Application No. PCT/US2019/015558, 10 pages.
Wikipedia "Thermal Spraying," author unknown, retrieved from https://en.wikipedia.org/w/index.php?title=Thermal_spraying&oldid=893967885, last edited on Apr. 24, 2019, 8 pages.
Bruton et al., "Cold Spray Metallic Coating and Methods," U.S. Appl. No. 16/215,386, filed Dec. 10, 2018.
Che et al., "Metallization of carbon fibre reinforced polymers by cold spray," Surface & Coatings Technology 313 (2017) 236-247.
Tsipouridis, (Authorized Officer), International Search Report and Written Opinion mailed Apr. 11, 2019 issued in related International Application No. PCT/US2019/015558 filed Jan. 29, 2019.
Zhou et al., "Preparation of metallic coatings on polymer matrix composites by cold spray," Surface & Coatings Technology 206 (2011) 132-136 (Year: 2011).
Extended European Search Report issued Jan. 26, 2021 in corresponding European Application No. 20180711.2, 12 pages.
Ganesan et al., "Cold Spray Coating Deposition Mechanism on the Thermoplastic and Thermosetting Polymer Substrates," Journal of Thermal Spray Technology, Apr. 19, 2013 (revised Jul. 7, 2013), vol. 22(8), ASM International 8 pages.
Bruton et al., Composite Laminates with Metal Layers and Methods Thereof, U.S. Appl. No. 17/653,336, filed Mar. 3, 2022, 30 pages.
Extended European Search Report for European Application No. 23159642.0 dated Jul. 6, 2023, 7 pages.
Extended European Search Report for European Application No. 23159607.3 dated Jun. 19, 2023, 6 pages.
Extended European Search Report for European Application No. 23193578.4 dated Dec. 13, 2023, 5 pages.

* cited by examiner

COLD SPRAYED ELECTRICAL CIRCUITS AND METHODS THEREOF

TECHNICAL FIELD

The present disclosure relates to a process for providing electrical circuits for composite structures, as well as composite structures having cold sprayed metallic electrical circuits integrated therein.

BACKGROUND

Aerospace vehicles such as commercial aircraft and their integrated components undergo various fluctuations in mechanical, temperature, and other environmental conditions during manufacture and service. For example, with the integration of circuits or wires in structural or non-structural components along with the reduction of the number of wires in wire bundles, the enhancement of safety with regard to more robust wire insulation and a reduction in wire chaffing and other defects is important in such vehicle component design. Wires may be used as integrated sensors for structural health monitoring in structures, often by the detection of a simple break in the circuit. Damage to wiring is of concern as large wire bundles on aircraft and wire bundles can be complex due to the number of wires required to remain precisely connected throughout the aircraft.

While techniques exist to deposit conductive materials, they are unable to build sufficient thickness for such purposes. More robust wiring approaches are desired for improvements in aircraft and other vehicle wiring, as well as for providing an integrated structural component having inclusive circuitry. Thus, it is desirable to provide a more robust wiring process for some aircraft wiring, as well as providing a more secure wiring system. There is further a need for the improvement in the service life and robustness of wire bundles within aircraft and other vehicle components.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Examples of the disclosure provide a cold sprayed metal coated article. The cold sprayed metal coated article includes a polymeric material having at least one surface, an electrochemical insulating layer on the at least one surface, and an electrically conductive cold sprayed metal coating present on at least a portion of a surface of the electrochemical insulating layer, at least one additional layer, the at least one additional layer sandwiching at least a portion of the cold sprayed metal between the additional layer and the electrochemical insulating layer, and where the electrically conductive cold sprayed metal coating may be at least partially encapsulated within the article.

Implementations of the cold sprayed metal coated article may include where the polymeric material includes epoxy, phenolics, polyesters, ureas, melamines, polyamides, polyimides, poly-ether-ether-ketones (PEEK), poly-ether-ketone-ketones (PEKK), polyphthalamides, polyphtalates, polysulfones, polyurethanes, chlorinated polymers, fluorinated polymers, polytetrafluoroethylene, polycarbonates, liquid crystal polymers, partially crystalline aromatic polyesters, and modified versions thereof containing one or more fillers or reinforcement materials may include carbon, carbon nanotubes, graphite, carbon fibers, graphite fibers, fiberglass, glass fibers, metals, metal alloys, metalized fibers and metal coated glass fibers. The electrochemical insulating layer may include a thermoplastic. The electrochemical insulating layer may include poly-ether-ether-ketones (PEEK), poly-ether-ketone-ketones (PEKK), or a combination thereof. The metal coating is selected from silver, gold, aluminum, cobalt, chromium, copper, iron, nickel, molybdenum, palladium, platinum, rhodium, ruthenium, tin, titanium, tungsten, zinc, zirconium, or alloys thereof. The electrically conductive cold sprayed metal coating may be completely encapsulated within the article. A deposition pattern of the electrically conductive cold sprayed metal coating may form at least a portion of a resistive heater. A deposition pattern of the electrically conductive cold sprayed metal coating may form at least a portion of an electrical circuit. The polymeric material may be a component or part of an aerospace vehicle, alternatively as an external surface thereof. The electrically conductive cold sprayed metal coating may include one or more non-continuous segments, where the one or more non-continuous segments are not in lateral contact with one another.

Examples of the disclosure provide a structural component. The structural component includes a polymeric composite material having at least one surface, a thermoplastic electrochemical insulating layer on the at least one surface, an electrical circuit may include a cold sprayed metal coating present on at least a portion of a surface of the electrochemical insulating layer, and at least one additional layer, the at least one additional layer encapsulating at least a portion of the cold sprayed metal between the additional layer and the electrochemical insulating layer. The structural component may include where the cold sprayed metal coating has one or more non-continuous segments, where the one or more non-continuous segments are not in lateral contact with one another.

Implementations of the structural component may include where an electrical resistivity value of the cold sprayed metal coating changes when the structural component undergoes flexion. The structural component may be a part of an aerospace vehicle. The metal coating is selected from silver, gold, aluminum, cobalt, chromium, copper, iron, nickel, molybdenum, palladium, platinum, rhodium, ruthenium, tin, titanium, tungsten, zinc, zirconium, or alloys thereof.

A method of providing an electrical connection within a multilayered composite article is disclosed. The method of providing an electrical connection within a multilayered composite article includes introducing particles of a metal powder or metal alloy powder or a mixture of the metal powder and the metal alloy powder to a gas stream, directing the gas stream toward a thermoplastic electrochemical insulating layer present on a surface of a polymer, where the gas stream has a temperature and pressure adjusted to prevent thermal softening or ablation of the surface of the electrochemical insulating layer, forming a metallic coating on at least a portion of the electrochemical insulating layer. The method of providing an electrical connection within a multilayered composite article also includes providing an electrical connection within the multilayered via the metallic coating.

Implementations of the method of providing an electrical connection within a multilayered composite article where the gas stream is directed toward the thermoplastic electrochemical insulating layer according to a specific pattern. The thermoplastic electrochemical insulating layer may include poly-ether-ether-ketone (PEEK), poly-ether-ketone-ketone (PEKK), or a combination thereof. The temperature of the gas stream is between 100° C. and 500° C. and the pressure of the gas stream is between 100 psi and 400 psi. The gas stream may be either air, nitrogen or helium or combinations thereof. The metallic coating may include one or more non-continuous segments, where the one or more non-continuous segments are not in lateral contact with one another.

BRIEF DESCRIPTION OF DRAWINGS

The accompanying drawings, which are incorporated in and constitute a part of this specification, illustrate embodiments of the present teachings and together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Within certain aerospace components and other structures, integrated circuitry and wire bundles can be large and heavy and potentially develop errors due to the large number of wires in many bundles. It would be advantageous to reduce the number of wires, bundles of individual wires, and possibly the amount of time to run power or circuits to many places on an aircraft, for example. De-icing can be an area of issue for aircraft. Bleed air from aircraft engines reduces the power from the engines to de-ice the wings of fixed-wing aircraft, which reduces the efficiency of the engines. Past attempts to use electrical de-icing for aircrafts, have been known to suffer deficiencies resulting from electric blanket failure. For rotorcrafts, there are limited reliable methods for delivering bleed air to the rotorcraft blades and electrical de-icing methods may exhibit wire failure due to wire breakage. If such damage occurs, this is not easily repairable as individual or bundled wires are often embedded into the structure of the rotorcraft blade. Structural health monitoring of composite structures has been done in aircraft by wires based on a phenomenon that when the structure is damaged or stretched beyond its specified strength the wire breaks. The aforementioned issues may be reduced or eliminated with the use of wiring within components and processes and also provides integrated electrical wiring or circuitry, for example, resistive heaters for deicing of rotor blades or wings.

The present disclosure provides a process for providing robust electrical circuits or wiring into structural or non-structural components or onto a surface of a polymer according to the present disclosure comprises a step of projecting metal particles, using a cold spraying method, onto at least a portion of the surface of a polymer, thereby forming a metallic coating. A metallic coating formed in such a manner and optionally encapsulated into the blade components or other structural components, rather than one based on individual or bundles of embedded wires would improve the integrity of such wire bundles, making them more robust. For example, providing circuits or wires into structural or non-structural components and reducing the number of wires in wire bundles, enhancing safety in more robust wire insulation, and reduce wire chafing.

In this process, metal particles are projected onto the surface of a polymer composite layer of a multilayered composite article to form a metallic coating with excellent adhesion, in some examples, in a specific pattern, thereby imparting an electrically conductive circuit onto a surface of the polymer. The metallic coating can alternatively be continuous on the surface of the polymer. The metallic coating can be semi-continuous on the surface of the polymer and may or may not contact a separate semi-continuous segment or portion in one or more lateral directions. The metallic coating can be patterned on the surface of the composite layer polymer using conventional masking techniques or alternatively automated robotic methods. This composite layer polymer with integrated electrical connections within the multilayered composite article via the metallic coating is produced using a technique in which metal particles are projected directly onto the surface of a composite layer polymer, and a metallic coating that exhibits excellent adhesion and electrical conductivity within the composite is provided.

Furthermore, a polymeric material with integrated wiring or electrical conductivity according to the present disclosure is a structure comprising a polymer that comprises an electrochemical insulating layer, and an electrically conductive cold sprayed metal coating present on at least a portion of a surface of the electrochemical insulating layer. In certain aspects, the formation of metal traces, for example ranging from circuit patterns to complete circuits upon an electrochemical insulating layer within the composite structure, and encapsulating at least a portion of the trace in a structural or nonstructural composite workpiece. The proposed cold spray solution does not suffer deformation defects when subjected to deformation and flexing. While processes or methods other than cold spray add individual atoms, cold spray adds larger particles, which may vary in orders of magnitude of material ranging from nanometer to microns or larger in diameter.

As used herein, "alloy" means a substance composed of two or more metals or a metal and a nonmetal intimately united usually by being fused together and dissolved in each other when molten.

As used herein, "cold sprayed metal" coating refers to a coating of metal layer formed via a deposition method where solid metal particles are accelerated in a gas stream to velocities capable of providing plastic deformation of the metal particles during impact with the substrate and providing and adherence of the metal particles to the substrate surface, for example, up to and including 1200 m/s. Cold spray metal coating avoids melting of the metal particles during the spraying process and can be performed well below a melting temperature for the solid metal particles and thus reduces thermal damage to the substrate being coated.

As used herein, "thermal sprayed metal" coating refers to a metal layer formed via a coating process in which melted (or heated near the melting point) metal are sprayed onto a substrate surface. The metal feedstock is typically particles heated by electrical (e.g., plasma or arc) or chemical (e.g., combustion flame) processes.

As used herein, "multilayered composite" refers to a composite material including more than one layer of differing materials, which can include, but is not limited to, a polymeric or metal substrate layer having one or more laminations of additional layers incorporated thereon, and the like. A polymeric substrate layer can also include a fiber-reinforced multilaminate composite structure.

As used herein, the phrase "electrochemical insulating layer" means a substance that prevents or eliminates electrochemical interactions between materials separated therefrom. Electrochemical interactions include oxidation-reduction reactions between materials and chemical reactions caused by an externally supplied current. Exemplary electrochemical interactions include, but are not limited to, galvanic and/or oxidation-reduction interactions of metal of the metallic layer present on fiber reinforced plastics with one or more components of fiber reinforced plastics. In one aspect, the electrochemical insulating layer prevents or eliminates electrochemical interactions between a cold or thermal sprayed metal and one or more components of the FRP composite. In one aspect, the electrochemical insulating layer prevents or eliminates electrochemical interactions between a cold or thermal sprayed metal and carbon fibers of the FRP composite.

As used herein, the term "surface" means a surface located on a particular side of an article. A side of an article may include various surfaces or surface areas, including, but not limited to, a polymer article surface area or joint surface area, etc. Thus, when reciting a coating or layer is applied to a "surface" of a polymer or an article made therefrom, it is intended that such surface can comprise any one or all of the surfaces or surface areas located on that particular side of the polymer being coated.

Polymeric Material or Substrate

Examples of polymeric materials that can be used (e.g., as a substrate) that undergoes surface coating with a metallic coating or circuit layer in accordance with the present disclosure include polymeric materials that act as a matrix in combination with one or more types of fibers or other reinforcing or functional additives. In one example, materials useful for the practice of the present disclosure include fiber-reinforced plastics (FRP) comprising a polymeric material in combination with an inorganic fiber such as fibers of carbon, carbon nanotubes, graphite, fiberglass, glass, metals, metal alloys, or metalized fibers and metal coated glass fibers, alumina fiber or boron fiber. In one example, the fiber reinforced plastic can comprise organic fiber such as a nylon fiber, or aramid fiber. In one example, the fiber reinforced plastic can comprise organic fiber and/or inorganic fiber blended into a thermosetting or epoxy.

In one example, a carbon fiber reinforced plastic (CFRP) or glass fiber reinforced plastic (GFRP) as the polymeric article made therefrom is imparted with integrated electrical conductivity via cold sprayed coated circuitry via one or more coated traces suitable for aircraft structures or the like. However, the present disclosure is not restricted to these types of materials or any particular arrangement, and articles formed from other polymers can also be used in the presently disclosed process of the present disclosure.

In one example, the polymeric substrate material comprises a crystalline polymer. Crystalline polymers provide high temperature resistance as well as chemical resistance to FRPs. In another example of the polymer substrate comprises a semi-crystalline polymer. Semi-crystalline polymers provide the benefits of crystalline polymers along with ductility and processing advantages to FRPs. In yet another example, the polymer substrate comprises an amorphous polymer. Amorphous polymers provide for resiliency, ductility and processing advantages to FRPs.

In one example the polymer substrate is selected from epoxies, phenolics, polyesters, polyesters, ureas, melamines, polyamides, polyimides, poly-ether-ether-ketones (PEEK), poly-ether-ketone-ketone (PEKK), polyetherimide (PEI), polyphthalamide, polyphtalates, polysulfone, polyurethanes, chlorinated polymers, fluorinated polymers, polytetrafluoroethylene, polycarbonates, liquid crystal polymers, partially crystalline aromatic polyesters, and modified versions thereof containing one or more fillers or reinforcement materials selected from carbon, carbon nanotubes, graphite, carbon fibers, graphite fibers, fiberglass, glass fibers, metals, metal alloys, metalized fibers and metal coated glass fibers.

Electrochemical Insulating Layer

In one example, an electrochemical insulating layer is provided between the polymer substrate surface and the cold spray deposited metallic coating or layer. Exemplary electrochemical insulating layer materials may include nonconductive materials, such as fiberglass, polymers, and ceramics. Exemplary electrochemical insulating layer materials include, but are not limited to non-conductive polymers (e.g., PEEK or PEKK) with or without fillers; nonconductive fiber-impregnated fabrics, polymers, thermoplastic polymers, and thermosets; or other coatings containing nonconductive fiber-reinforcing materials. In one example the electrochemical insulating layer is impregnated with fiberglass ($Si_xO_y$). In another example the electrochemical insulating layer includes a metal-metal oxide composite material such as aluminum-aluminum oxide (Al—$Al_2O_3$), or is titanium oxide ($TiO_2$), silicon oxy carbide ($SiO_xC_y$) and the like. In another example, the electrochemical insulating layer includes a cemented carbide alloy, or tungsten carbide (WC). In one aspect, the electrochemical insulating layer can be applied to the polymer surface using, for example, chemical vapor deposition, atmospheric plasma deposition, melt deposition, or by way of curable glass fiber or other nonconductive fiber-reinforced thermosets, paints, or coatings. In one aspect, the electrochemical insulating layer may be a thermoplastic material. In another aspect, the electrochemical insulating layer may be built into a layup of the polymer composite substrate structure. In one alternative aspect, a non-insulator may be used, such as tungsten carbide cobalt nickel alloy (WC—Co—Ni).

Cold Spray Metallic Circuit Forming Layer

In one example, the present disclosure further comprises introducing an electrically conductive layer onto the electrochemical insulating layer, which can include at least one additional layer sandwiching at least a portion of the cold sprayed metal circuit forming layer between the at least one additional layer and the electrochemical insulating layer present on the polymer substrate surface. In one example, the cold sprayed metal circuit forming layer is cold sprayed on at least a portion of the electrochemical insulating layer present on the polymer substrate surface. In one aspect, the cold sprayed metal circuit forming layer can be applied using, for example, chemical vapor deposition, atmospheric plasma deposition, and metal melt deposition.

The cold sprayed metal circuit forming layer can be selected from Al, Ag, Au, Co, Cr, Cu, Fe, Ni, Mo, Pd, Pt, Rh, Ru, Sn, Ti, W, Zn, Zr, and alloys thereof. In one example, the cold sprayed metal circuit forming layer comprises cold sprayed copper. In one example, multiple layers of cold sprayed metal can comprise the cold sprayed metal circuit forming layer, provided that at least one layer of the cold sprayed metal circuit forming layer is electrically conductive. In one example, the cold sprayed metal circuit forming layer comprises cold or thermal sprayed copper on a carbon fiber or glass fiber reinforced poly-ether-ether-ketone (PEEK) or poly-ether-ketone-ketone (PEKK).

At least one additional layer can be provided, the at least one additional layer sandwiching at least a portion of the cold sprayed metal between the additional layer and the electrochemical insulating layer to encapsulate at least a portion of a first cold sprayed metallic coating present within the article or entire composite structure. In one example, the additional layer is of a different metallic composition than that of the first cold sprayed metallic coating present on the electrochemical insulating layer surface. In one example, the additional layer is cold or thermal sprayed on at least a portion of the first cold sprayed metallic coating present on the electrochemical insulating layer surface. In one aspect, the additional layer can be applied using, for example, chemical vapor deposition, atmospheric plasma deposition, and metal melt deposition. In alternate examples, the additional layer may be composed of one or more materials similar or identical to either the materials described for use as the polymeric composite substrate layer or layers, the electrochemical insulating layer, or a combination thereof.

The polymer or electrochemical insulating layer can be subjected to a pretreatment prior to formation of the metallic coating, for example, by roughening the surface of the polymer to provide an irregular surface topography. An irregular surface topography can result from various surface pretreatment methods, such as mechanical abrasion and etching. Such surface irregularities can contribute to a surface texture that influences bond strength between the metallic layer and the substrate surface. Suitable examples of roughening the surface of the polymer include fine particle shot blasting where such fine particles can be such as metals, ceramics and glass. The particles used in the shot blasting can be substantially spherical or contain edges. Other surface roughening methods may be used as known in the art.

In one example, following completion of this optional surface roughness pretreatment, which may be used as required to roughen the surface of the thermoplastic polymer, metallic particles are projected onto the surface of the polymer using a cold spraying method, so as to form a metallic coating thereon. In another example, the cold sprayed metal layer conforms to the original surface roughness of the electrochemical insulating polymer surface, making the resultant metal coated electrochemical insulating surface amenable to painting and other fabrication.

The cold spraying method is a technique in which a propellant gas for metallic particles is heated to a temperature that is lower than the melting point or softening point of the metallic particles, and the metallic particles are then sprayed using the propellant gas, thereby causing the metallic particles to impinge into the substrate in a solid state, forming a coating or layer. Provided the collision velocity of the cold sprayed particles is greater than a certain fixed velocity, which is specific to the metal or other particle being cold sprayed (the critical velocity), the kinetic energy of the particles causes the particles to undergo a plastic deformation, enabling formation of the coating to start. This critical velocity varies depending on the metal or alloy used for the particles and the glass transition temperature of the substrate, as well as the particle size. In the present disclosure, the spray pressure of the above propellant gas is selected so that the collision velocity of the metal particles striking the polymer reaches a critical velocity associated with the metal used and the polymer substrate, and is typically set to a value of between about 100 to about 400 psi.

The heating temperature of the propellant gas comprising the metal particles is usually selected appropriately in accordance with the materials being used, and is typically set to a value of about 100° C. and not more than 500° C. In one example, the gas flow uses a gas having a pressure of from between about 100 psi and about 400 psi, so as to provide a temperature below the melting point of the metallic particles. In one example the temperature is between about 100° C. to about 500° C. These conditions provide for efficient acceleration of the metallic particles, and reduces thermal and chemical effects associated with higher temperatures typically used in thermal spray processes.

In one example, readily available air, helium, nitrogen, or mixtures thereof can be used as the gas for forming a gas stream to reduce oxidative effects and reduce cost. The air or nitrogen makes it possible to regulate the velocity of metallic particles within a range of subsonic to supersonic velocity, e.g. from 300 to 1200 m/s. Controlling the velocity of particles can be achieved by heating the gas and also provides for regulation of the velocity of particles within wider limits than currently available. For example, heating a gas may increase the particle velocity during a cold spray process while maintaining consistent gas pressure.

An apparatus for carrying out the method for applying a coating can comprise a metering powder feeder having a casing incorporating a hopper for containing the metallic particles. In one example the hopper is formed as a drum having depressions in its cylindrical surface for metering the metallic particles and presenting the powder to a mixing chamber provided with a nozzle configured for accelerating the metallic particles. A source of compressed gas is connected to the mixing chamber. A metallic particle flow controller is operably connected to the cylindrical surface of the drum, providing a space that results in a desired flowrate of the particles. An intermediate nozzle can be connected to the mixing chamber that communicates, via an inlet pipe, with the source of compressed gas. In one example a CenterLine (Windsor) Limited system (Ontario, Canada), with robotics, is used as the cold spray apparatus.

The presently disclosed method provides for applying a conductive, metallic coating or layer to the surface of a polymer, such as an FRP. In one example, the particles are of a size of from 1 to 50 microns in an amount so as to provide a density of mass flow rate of the particles suitable for providing a continuous, non-continuous, or patterned metallic coating on the substrate surface that is dense, for example, having a low volume of microvoids to optimize conductivity of the coating. A dense coating, free of microvoids, may refer to a coating having particle to particle contact internally and between particles, such that the continuity of particles provides physical and electrical integrity. Microvoids, or porosity within a coating layer could lead to cracking and other issues related to physical integrity of a coating, breaks in electrical continuity, or a combination thereof. A continuous metallic coating refers to a coating that completely covers a portion of a surface of a polymer being coated. A patterned or non-continuous coating may refer to a metallic coating that is applied according to a specific pattern, via masking, manual process controls, automatic or machine-controlled processes, in such a manner that provides one or more breaks or disruptions in the metallic coating layer in contrast to a continuous metallic coating layer. While the terms continuous as compared to patterned or non-continuous metallic coating refer to a macrostructure of the metallic coating layer, the description of a metallic coating layer having microvoids can be considered to be in reference to the microstructure of the metallic coating layer. The resultant metallic coating or layer is uniform, without phase transformations, and generally conformal to the surface roughness of the substrate. The resultant metallic coatings or layers do not crack, have metal like microhardness, and display excellent cohesive and adhesive strength. An average particle size of less than 1 micron is undesirable, as a stable spray state may not be achievable. If the average particle size exceeds 50 microns, then uniform deposition of the particles becomes problematic. Average particle size may be determined in a commercially classified product, or by laser light scattering, according to several methods, for example, ASTM B822-20, Standard Test Method for Particle Size Distribution of Metal Powders and Related Compounds by Light Scattering.

Using the process described above, a metallic coating is formed on at least a portion of the surface of the electrochemical insulating layer polymer, thereby imparting electrical continuity or electrical conductivity, a portion of an electrical circuit, fatigue monitoring circuitry, or one or more integrated wiring harnesses to the surface of the polymer composite material, and/or into a structural component of or a portion of a vehicle.

In a polymer composite structure with electrical continuity obtained in this manner, the thickness of the metallic coating can be from 1 mil (25.4 microns) to 14 mils (356 microns). In certain aspects, the metallic coating may be thicker, and in some examples, as thick as 30 mils (762 microns) or even 50 mils (1270 microns). Where the polymer composite structure with electrical continuity, electrical conductivity, a portion of an electrical circuit, fatigue monitoring circuitry, or one or more integrated wiring harnesses to the surface of the polymer composite material is used as an aircraft main wing structure that exhibits integrated electrical conductivity, the thickness of the metallic coating is preferably not less than 3 mils (76 microns) and not more than 10 mils (254 microns), e.g., so as to not contribute to the weight of the structure.

The metallic coating can be formed from a single layer, or can be formed by depositing two or more layers together. In the case of a two-layer coating, aluminum or nickel, either of which exhibits excellent adhesion to a variety of electrical insulating layers, can be used for forming the layer closest to the substrate of the polymer. In one example, forming a layer of aluminum closest to the substrate surface of the polymer is performed. In one example, so as to provide an acceptable level of electrical conductivity or electrical connectivity, a layer of aluminum is sprayed closest to the substrate of the polymer followed by a sprayed layer of copper or other electrically conductive metal.

Figure 1:
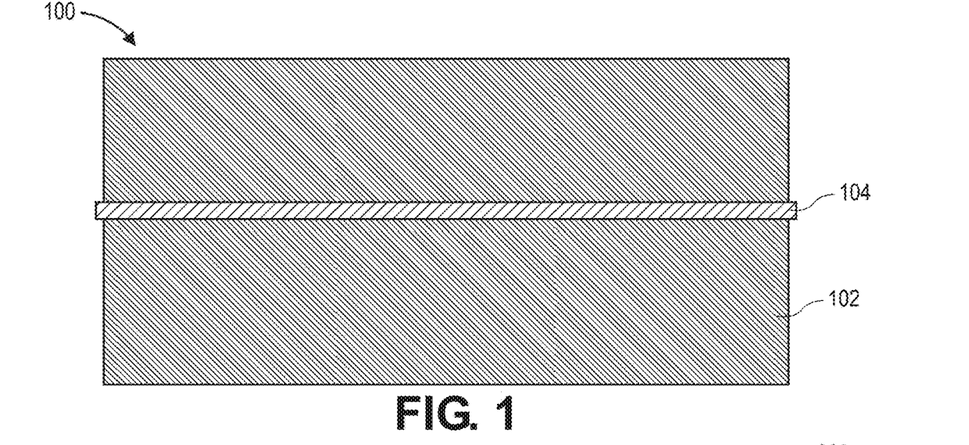
FIG. 1 depicts a top view of a printed circuit embedded upon a thermoplastic layer of a polymeric composite structure, in accordance with the present disclosure.

FIG. 1 depicts a top view of an electrically conductive printed circuit 104 embedded upon a thermoplastic layer of a polymeric composite structure, in accordance with the present disclosure. The electrically conductive printed circuit 104 embedded on a polymeric composite structure 100 includes an electrochemical insulating layer 102, which is deposited onto at least a portion of a surface of a substrate. The substrate, not shown in this view, can be an epoxy, phenolic, polyester, polyester, urea, melamine, polyamide, polyimides, poly-ether-ether-ketones (PEEK), poly-ether-ketone-ketone (PEKK), polyphthalamide, polyphthalates, polysulfone, polyurethanes, chlorinated polymers, fluorinated polymers, polytetrafluoroethylene, polycarbonates, liquid crystal polymers, partially crystalline aromatic polyesters, and modified versions thereof. The polymer substrate can be one of the polymers listed above containing one or more fillers or reinforcement materials comprising carbon, carbon nanotubes, graphite, carbon fibers, graphite fibers, fiberglass, glass fibers, metals, metal alloys, metalized fibers, metal coated glass fibers, ceramic fibers including, but not limited to mullite, alumina, and the like, or combinations thereof. The electrochemical insulating layer 102 material includes non-conductive materials, such as fiberglass, polymers, and ceramics, optionally within a non-conductive polymer matrix. Exemplary electrochemical insulating layer materials include, but are not limited to non-conductive polymers (e.g., PEEK or PEKK) with or without fillers; nonconductive fiber-impregnated fabrics, polymers, thermoplastic polymers, and thermosets; or other coatings containing nonconductive fiber-reinforcing materials, such as fiberglass ($Si_xO_y$). A portion of an electrically conductive printed circuit 104 is shown deposited onto the electrochemical insulating layer 102, comprising an electrically conductive cold sprayed metal. The electrically conductive printed circuit 104 comprises silver, gold, aluminum, cobalt, chromium, copper, iron, nickel, molybdenum, palladium, platinum, rhodium, ruthenium, tin, titanium, tungsten, zinc, zirconium, alloys thereof, or combinations thereof.

Figure 2:
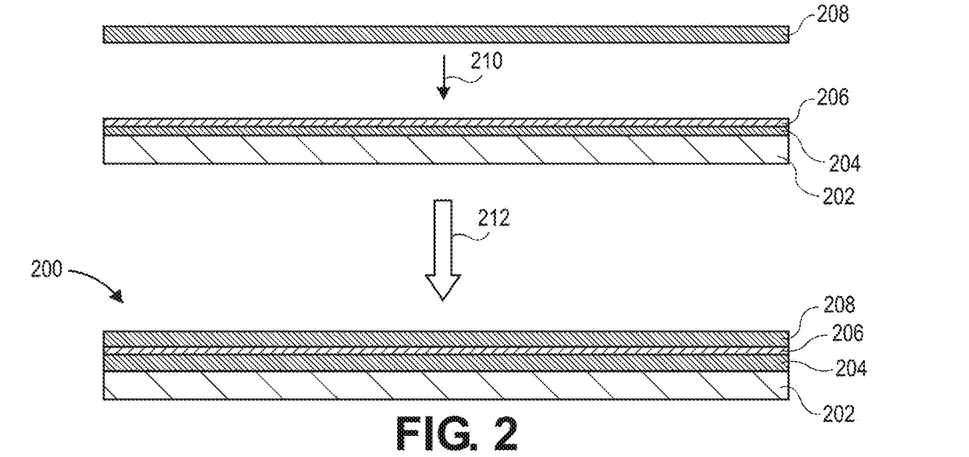
FIG. 2 depicts a cross-sectional view of a polymeric composite layered structure having a thermoplastic surface having a first metallic coating, sandwiched between a second polymer composite layer, obtained using the presently disclosed process.
Figure 3:
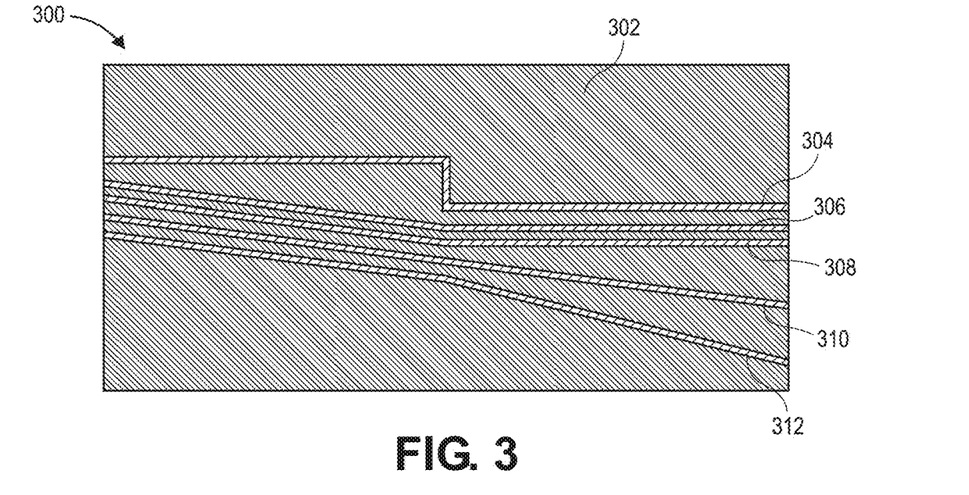
FIG. 3 depicts a top view of a printed circuit embedded upon a thermoplastic layer of a polymeric composite structure having multiple traces, in accordance with the present disclosure.

FIG. 2 depicts a cross-sectional view of a polymer composite layered structure having a thermoplastic surface having a first metallic coating, sandwiched between a second polymer composite layer, obtained using the presently disclosed process. A printed circuit embedded within a polymeric composite structure 200 is shown along with a partial depiction of the process to make the same, according to the present disclosure. A base polymer composite layer 202 or polymeric material having an upper electrochemical insulating layer 204, the surface of which is partially covered by an electrically conductive printed circuit layer 206 is depicted and may be considered to be a cross-section of an example as depicted in FIG. 1 or FIG. 3. With reference to FIG. 2, an additional layer 208 which may be comprised of any of the layers as disclosed herein, such as a polymeric composite, electrochemically insulating layer, or additional metal or metal alloy containing layer, is applied onto 210 onto a surface of the electrically conductive printed circuit layer 206. It should be noted that dependent upon the entire structural composition and function of the polymeric composite structure 200, the additional layer 208 may be a composition and pattern that electrically isolates some or all of the electrically conductive printed circuit layer 206 or alternatively may have additional features or contact points to contact a portion or entirety of the electrically conductive printed circuit layer 206. This additional layer 208 structure and function will then dictate its overall composition and structure. Furthermore, some portions of the inner facing surface of additional layer 208 may directly contact the electrochemical insulating layer 204 in some portions and the electrically conductive printed circuit layer 206 in some portions and the electrically conductive cold sprayed metal coating is at least partially encapsulated within the article or polymeric composite structure 200. Encapsulation refers to the electrically conductive cold sprayed metal coating being at least partially enclosed from an exterior of the polymer composite layered structure. In certain aspects, the electrically conductive cold sprayed metal coating is completely encapsulated, enclosed, or covered by either the additional layer 208, the electrochemical insulating layer 204, another layer, or a combination thereof, meaning that no portion is exposed to an exterior part of an entire composite layered structure. Thus, the at least one additional layer 208 sandwiches at least a portion of the cold sprayed metal between the additional layer and the electrochemical insulating layer. In some aspects, all portions of the inner facing surface of additional layer 208 may directly contact the electrochemical insulating layer 204 and the electrically conductive cold sprayed metal coating is completely encapsulated within the entire article or the polymeric composite structure 200. Once the additional layer 208 is applied to the electrically conductive printed circuit layer 206, some examples of the present disclosure may include an additional process step 212 to form the final polymeric composite structure 200, including heat, pressure, curing, atmospheric exposure, or a combination thereof. In one example, the base polymer composite layer 202 is a thermoset epoxy impregnated with carbon-based fiber or aluminum. In one example, the electrochemical insulating layer 204 is fiber reinforced PEKK or fiber reinforced PEEK. In one example, the electrically conductive printed circuit layer 206 is copper or silver. In one example, the additional layer 208 is multi-layered and is alternatively the same material as the base polymer composite layer 202, aluminum, a metal-metal oxide composite material such as aluminum-aluminum oxide (Al—Al$_2$O$_3$), titanium oxide (TiO$_2$), silicon oxy carbide (SiO$_x$C$_y$) and the like, or a combination thereof. In another example, the electrochemical insulating layer includes a cemented carbide alloy, such as tungsten carbide cobalt nickel alloy (WC—Co—Ni).

FIG. 3 depicts a top view of a printed circuit embedded upon a thermoplastic layer of a polymeric composite structure having multiple traces, in accordance with the present disclosure. An example of a printed circuit embedded upon a thermoplastic layer of a polymeric composite structure 300 is shown, where upon the top surface of a thermoplastic layer 302 on a surface of a polymeric composite substrate, the components of the electrically conductive printed circuit traces 304, 306, 308, 310, 312 have been applied to the thermoplastic layer 302. The printed circuit includes a first cold sprayed metal electrically conductive circuit trace 304, a second cold sprayed metal electrically conductive circuit trace 306, a third cold sprayed metal electrically conductive circuit trace 308; a fourth cold sprayed metal electrically conductive circuit trace 310, and a fifth cold sprayed metal electrically conductive circuit trace 312. The electrically conductive circuit traces 304, 306, 308, 310, 312 may comprise silver, gold, aluminum, cobalt, chromium, copper, iron, nickel, molybdenum, palladium, platinum, rhodium, ruthenium, tin, titanium, tungsten, zinc, zirconium, alloys thereof, or combinations thereof. While FIG. 3 depicts a specific pattern or arrangement of the electrically conductive circuit traces 304, 306, 308, 310, 312, some aspects of the present disclosure may include alternate patterns suitable for a specific application of such an electrical circuit embedded within a polymeric composite structure, such as wire bundling for vehicle systems connections, for example, lighting, heating, structural monitoring or combinations thereof. Still other aspects may include a deposition pattern of the electrically conductive cold sprayed metal coating forming at least a portion of a resistive heater or forming at least a portion of an electrical circuit such that an electrical resistivity value of the cold sprayed metal coating changes when the structural component undergoes flexion. Without being bound by any particular theory, bending or flexion in a structural component may cause an introduction of cracks in one or more layers of the layers, or in internal wires within the electrical circuit to a magnitude that results in a change of electrical resistivity along the electrical circuit trace. As a result of this internal breakdown from flexion of a structural component, more current can be required to maintain a circuit pathway, as the circuit has fewer contact points, thus increasing the resistance. This change may be measured remotely and provide an indication of fatigue in the structural component. In some aspects, the electrically conductive cold sprayed metal coating circuit traces may form or be deposited in a pattern exhibiting one or more non-continuous segments as shown in electrically conductive circuit traces 304, 306, 308, 310, 312, wherein the one or more non-continuous segments are not in full lateral contact with one another. This non-continuous segment arrangement provides one or more electrically conductive circuit traces 304, 306, 308, 310, 312 that can form individual electrical pathways within a multilayered composite as described herein, such that the electrically conductive circuit traces 304, 306, 308, 310, 312 can form individual legs within a particular electrical circuit or alternatively can form one or more bridges or jumpers between a first circuit internal to the polymeric composite structure and a second circuit, which may be internal or external to the polymeric composite structure. In other aspects, the segments may be partially continuous as required by the design or application of the embedded circuit. In some aspects, the polymeric composite structure 300 may be a component or part of an aerospace vehicle, and in some instances an external surface thereof. In exemplary examples of the present disclosure, the structures and methods described may be used to minimize wiring on an aircraft, such as running wires or thin or lightweight circuits embedded within composites to lights on tips of a wing or other external structure of a vehicle, thereby reducing weight and manufacturing time. In exemplary examples of the present disclosure, the structures and methods described may be used on internal circuits or structural components of aircraft and other vehicles. Patterns of the electrically conductive circuit traces may be provided using robotic or computer-controlled patterning, or alternatively cold sprayed manually using masking techniques or templates. In some aspects, low pressure spraying can be done in an open manufacturing environment without special equipment, such as additional particulate removal or environmental control methods.

EXAMPLES

Figure 4A:
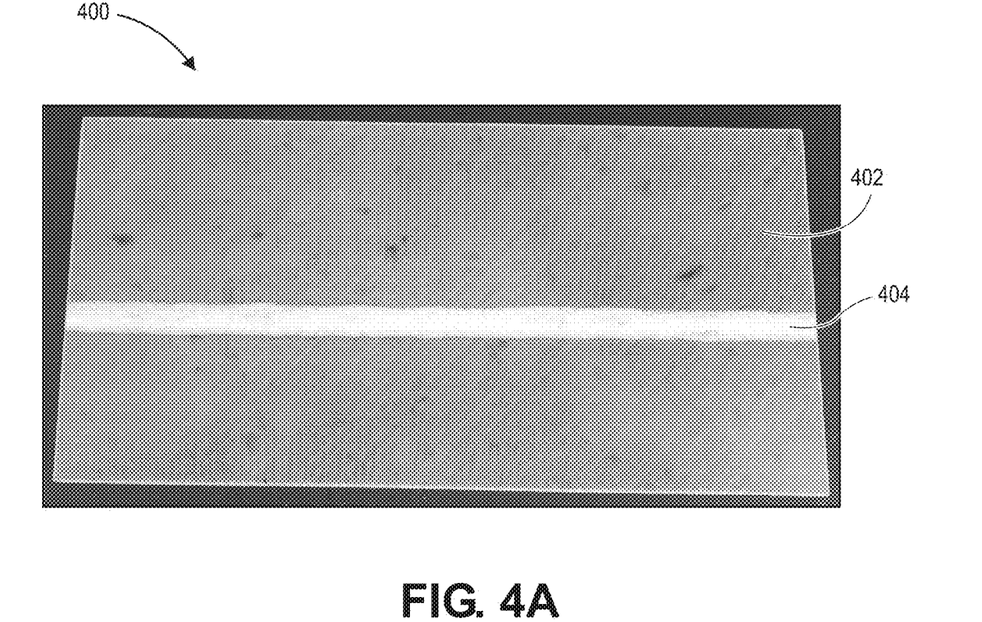
FIGS. 4A and 4B depict top views of a printed circuit embedded upon a thermoplastic layer of a polymeric composite structure at various stages of the presently disclosed process.
Figure 4B:
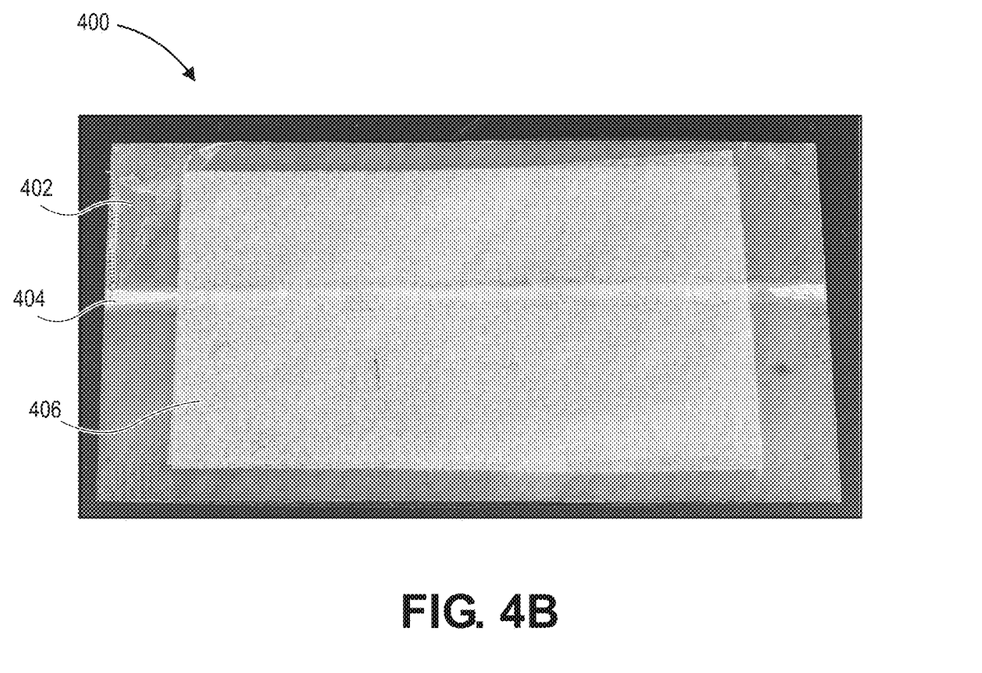

FIGS. 4A and 4B depict top views of a printed circuit embedded upon a thermoplastic layer of a polymeric composite structure at various stages of the presently disclosed process. The procedure to produce the examples shown in FIGS. 4A and 4B employed aluminum metallic particles having an average particle size of 40 microns as determined by laser light scattering or similar methods. Spraying conditions: CenterLine (Windsor) Limited system cold spray coating apparatus, with robotics spray pressure 100-400 psi, gas heating temperature 100° C.-500° C. Gas: air or nitrogen. In FIGS. 4A and 4B, a printed circuit embedded upon an electrochemical insulating layer of a polymeric composite structure 400 is shown. The polymeric composite structure 400 includes a top surface of an electrochemical insulating layer 402 on top of the polymeric composite structure 400. An underlying polymeric composite structure 400 of carbon fiber reinforced plastic (CFRP) was evaluated, having an electrochemical insulating layer 402 of carbon fiber or glass fiber reinforced PEKK on a surface. The electrochemical insulating layer 402 was subjected to a cold spraying treatment under the conditions described herein, thereby providing a first electrical circuit trace 404 onto the electrochemical insulating layer 402. As depicted in FIG. 4B, over the first electrical circuit trace 404, an additional layer 406 is then provided, thereby partially encapsulating the first electrical circuit trace 404 within the entire composition of the polymeric composite structure 400. The additional layer 406 is a polymeric composite as described herein, although alternative materials including plastics, metals, metal alloys, or combinations may be employed.

Figure 5:
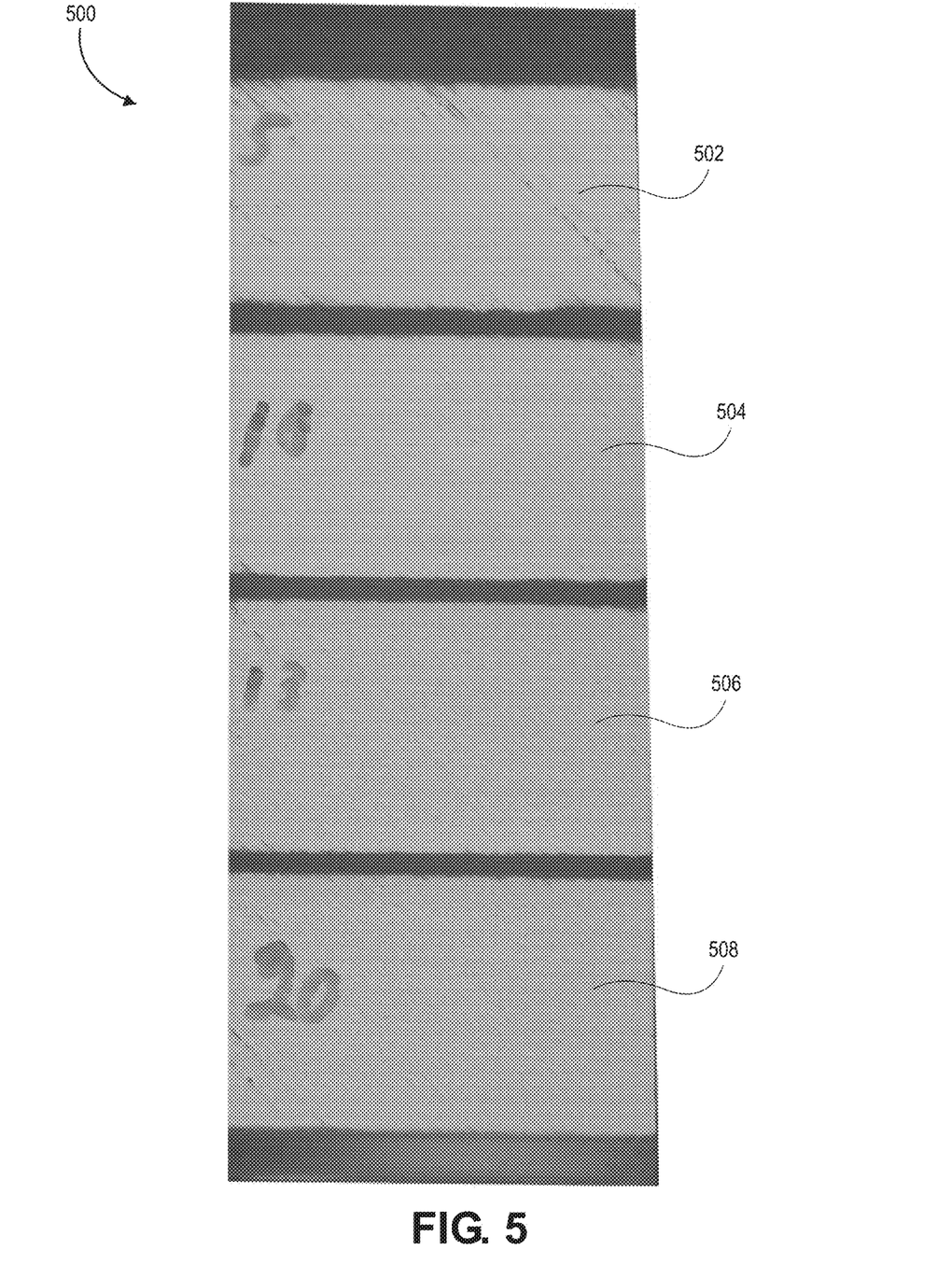
FIG. 5 depicts photographic experimental results of the cold spray metal deposition of an electrical circuit obtained using the presently disclosed process.

FIG. 5 depicts photographic experimental results of the cold spray metal deposition of an electrical circuit obtained using the presently disclosed process. An example substrate of a polymeric composite material 500 is subjected to various patches of electrically conductive cold sprayed metal. As shown in FIG. 5, a first patch of electrically conductive cold sprayed metal 502 at a thickness of 5 mils, a second patch of electrically conductive cold sprayed metal 504 at a thickness of 10 mils, a third patch of electrically conductive cold sprayed metal 506 at a thickness of 13 mils, and a fourth patch of electrically conductive cold sprayed metal 508 at a thickness of 20 mils are deposited upon the polymeric composite material 500 in accordance with the process of the present disclosure. Each patch 502, 504, 506, 508 has been deposited in a different thickness, showing a range of thickness results for a number of passes at a particular set of cold spray process conditions. The electrically conductive cold sprayed metal layers 504 are aluminum metal, and the number written on the aluminum surface is an approximate layer thickness in mils. The top aluminum layer is a single pass of cold sprayed aluminum, the second down is two passes, the third is three passes and so on. Gas temperature utilized in this example was 350° C., gas pressure was 200 psi, travel speed was 100 mm/sec, and nitrogen gas was used.

Figure 6A:
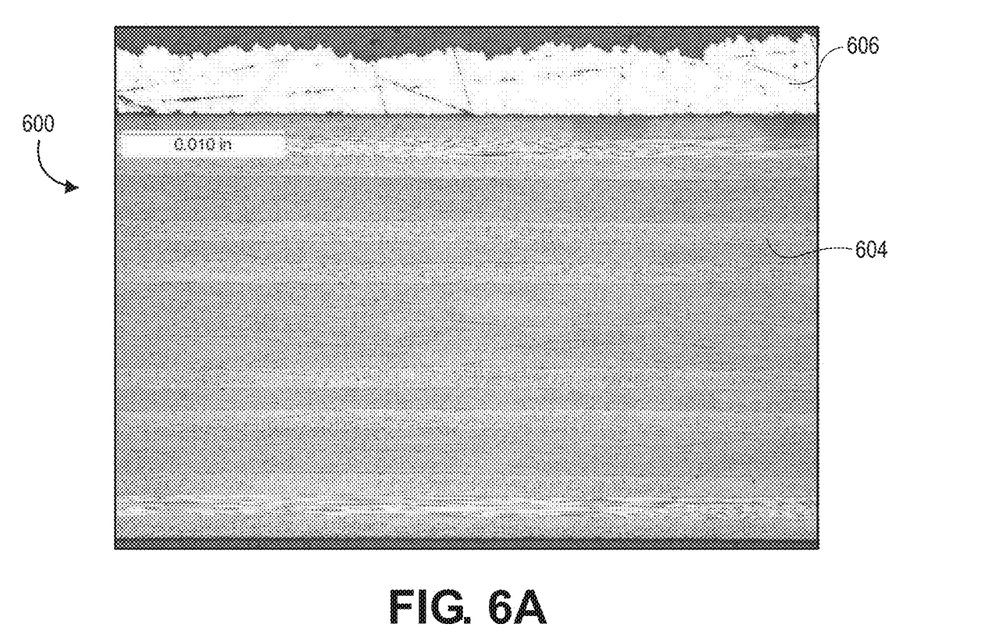
FIGS. 6A and 6B depict cross-sectional photographic experimental results of the cold spray metal deposition of an electrical circuit layer obtained using the presently disclosed process.
Figure 6B:
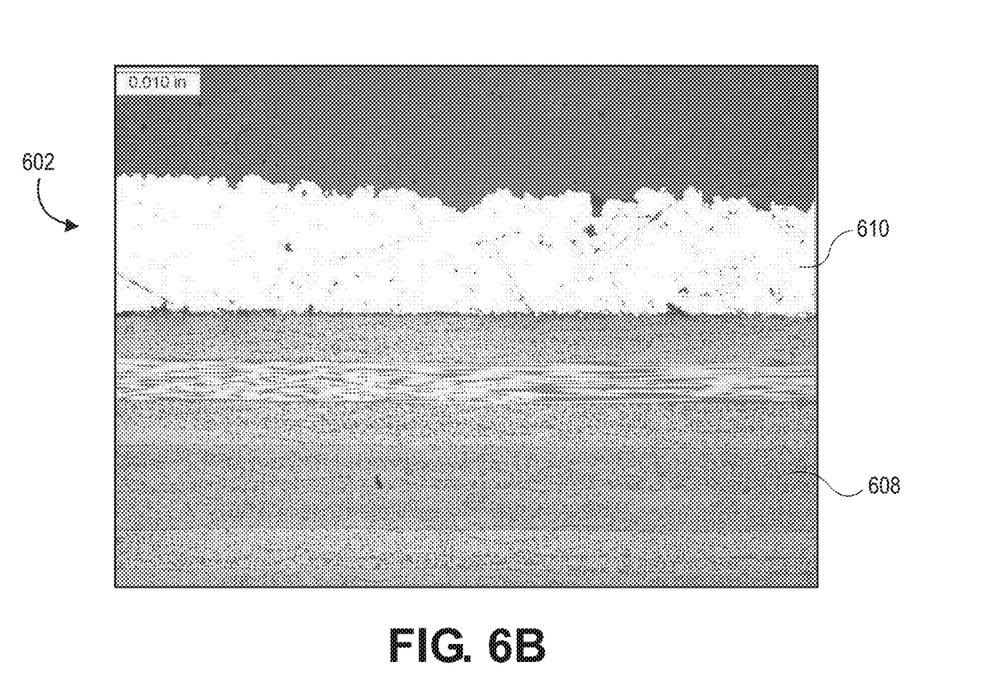

FIGS. 6A and 6B depict cross-sectional photographic experimental results of the cold spray metal deposition of an electrical circuit layer obtained using the presently disclosed process. A first cross-section 600 of a layer of an electrically conductive cold sprayed metal is shown in FIG. 6A and a second cross-section 602 of a layer of an electrically conductive cold sprayed metal is shown in FIG. 6B, both of which are provided with an expected thickness of approximately 20 mils of cold sprayed aluminum metal onto a PEKK carbon fiber polymeric composite substrate sample. The first cross-section 600 and the second cross-section 602 are shown at various magnifications. The first cross-section 600 shows a polymeric composite substrate layer 604 and a layer of electrically conductive cold sprayed metal 606. The second cross-section 602 includes a polymeric composite substrate layer 608 and a layer of electrically conductive cold sprayed metal 610. Thickness measurements performed by direct micrometer measurement demonstrate an average thickness of the electrically conductive cold sprayed metal layers 606, 610 to be 14.8 mils, or 0.014 inches. Experimental setup used in the example depicted in FIG. 6 was the same as noted in regard to FIG. 5. Additional passes of cold spraying was used to build thickness, taking approximately three passes to reach 14 mils of thickness.

Figure 7A:
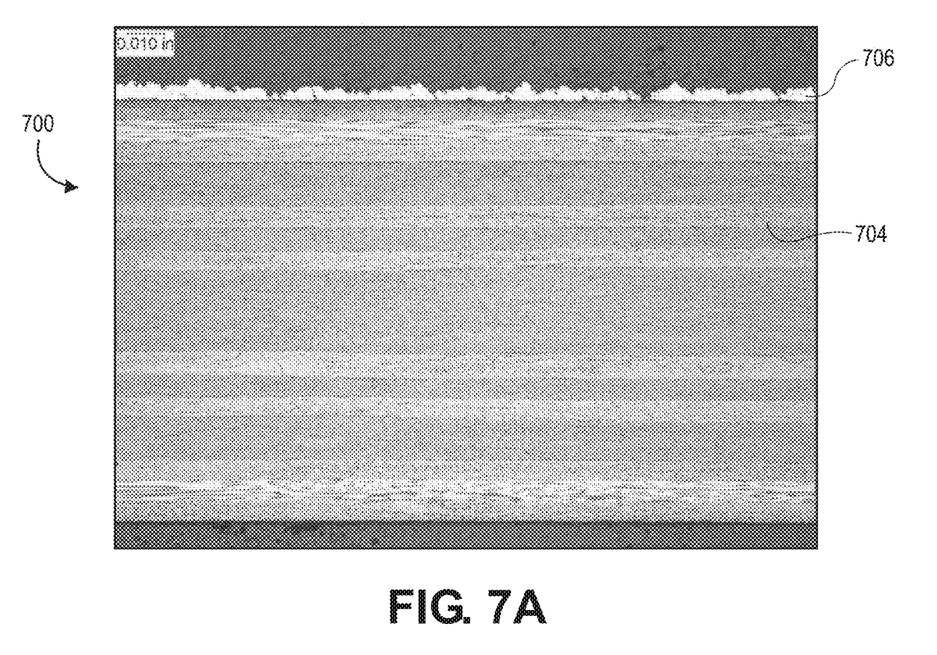
FIG. 7A and 7B depict photographic experimental results of the cold spray metal deposition of an electrical circuit layer obtained using the presently disclosed process.
Figure 7B:
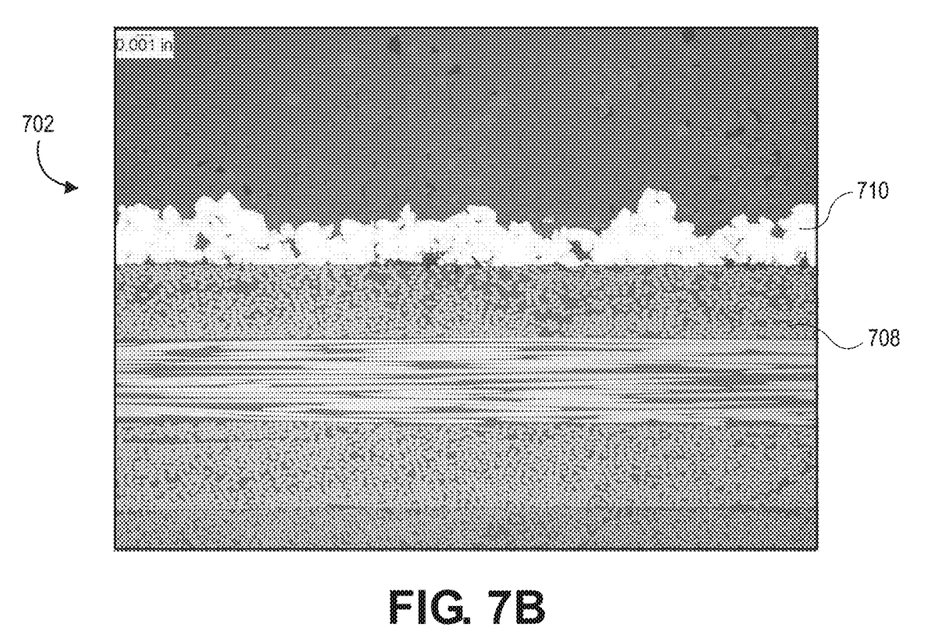

FIG. 7A and 7B depict photographic experimental results of the cold spray metal deposition of an electrical circuit layer obtained using the presently disclosed process. A first cross-section 700 of a layer of an electrically conductive cold sprayed metal is shown in FIG. 7A and a second cross-section 702 of a layer of an electrically conductive cold sprayed metal is shown in FIG. 7B, both of which are provided with an expected thickness of approximately 5 mils of cold sprayed aluminum metal onto a PEKK carbon fiber polymeric composite substrate sample. The first cross-section 700 and the second cross-section 702 are shown at various magnifications. The first cross-section 700 shows a polymeric composite substrate layer 704 and a layer of electrically conductive cold sprayed metal 706. The second cross-section 702 includes a polymeric composite substrate layer 708 and a layer of electrically conductive cold sprayed metal 710. Thickness measurements performed by optical microscopy demonstrate an average thickness of the electrically conductive cold sprayed metal layers 706, 710 to be 3.07 mils, or approximately 0.003 inches. Experimental setup used in the example depicted in FIG. 7 was the same as noted in regard to FIG. 5.

Figure 8A:
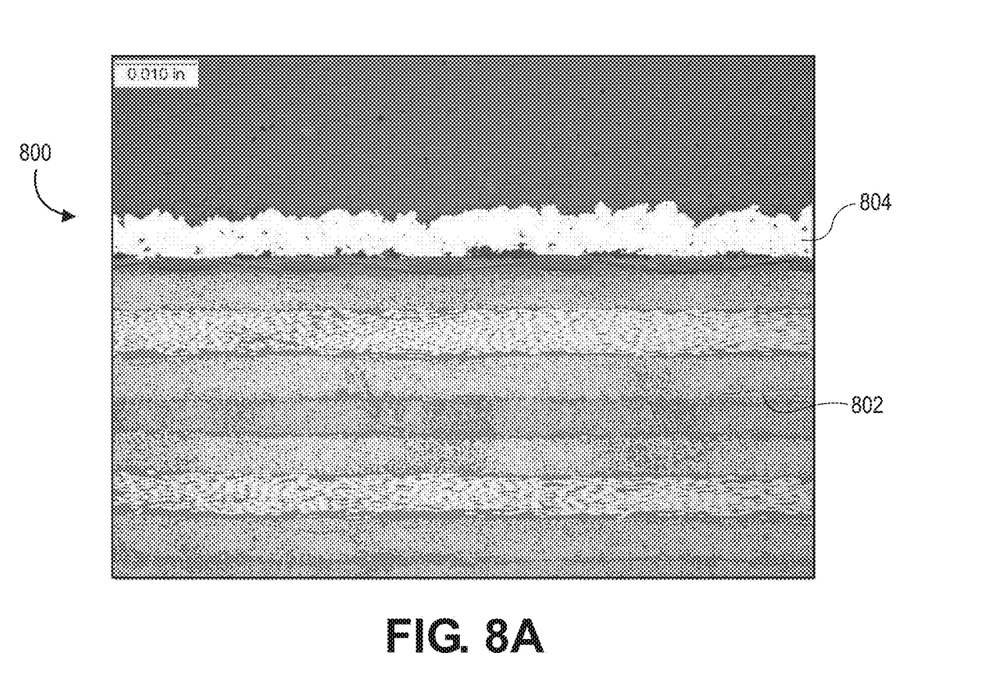
FIG. 8A and 8B depict photographic experimental results of the cold spray metal deposition of an electrical circuit layer obtained using the presently disclosed process.
Figure 8B:
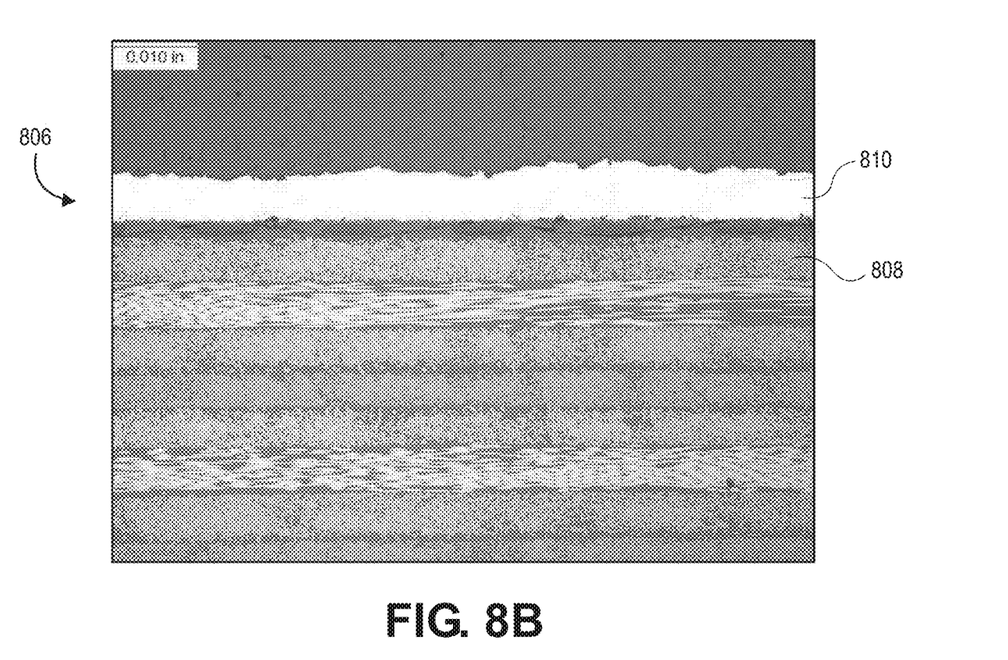

FIG. 8A and 8B depict photographic experimental results of the cold spray metal deposition of an electrical circuit layer obtained using the presently disclosed process. A first, unburnished cross-section 800 of a layer of an electrically conductive cold sprayed metal is shown in FIG. 8A and a second, burnished cross-section 806 of a layer of an electrically conductive cold sprayed metal is shown in FIG. 8B, both of which are provided with an expected thickness of approximately 10 mils of cold sprayed aluminum metal onto a PEKK fiberglass polymeric composite substrate sample. The first cross-section 800 and the second cross-section 806 are shown at similar magnifications. The first, unburnished cross-section 800 shows a polymeric composite substrate layer 802 and a layer of electrically conductive cold sprayed metal 804. The second, burnished cross-section 806 includes a polymeric composite substrate layer 808 and a layer of electrically conductive cold sprayed metal 810 that has been burnished. Glass bead burnishing utilized a #10 glass bead, 50 to 60 psi air pressure, a 100 mm/sec nozzle speed, and performed at room temperature. In certain examples, lower or higher pressures may be used successfully. Thickness measurements performed by optical microscopy demonstrate an average thickness of the unburnished electrically conductive cold sprayed metal layer 804 to be 6.34 mils, or 0.0063 inches, and the layer of electrically conductive cold sprayed metal 810 that has been burnished to be 7.18 mils, or 0.0072 inches. The appearance of the layer of electrically conductive cold sprayed metal 810 that has been burnished appears to be smoother with more interparticle contact between the cold sprayed metal particles, as compared to the cold sprayed metal particles shown in the layer of electrically conductive cold sprayed metal 804. While not wishing to be bound by any particular theory, a burnishing step in the process may provide an enhancement of surface smoothness while having fewer pores, which may contribute to robustness of a circuit trace or electrical circuit provided by the methods of the present disclosure. Burnishing may also provide an adhesion verification of the cold spray deposition layer.

Figure 9:
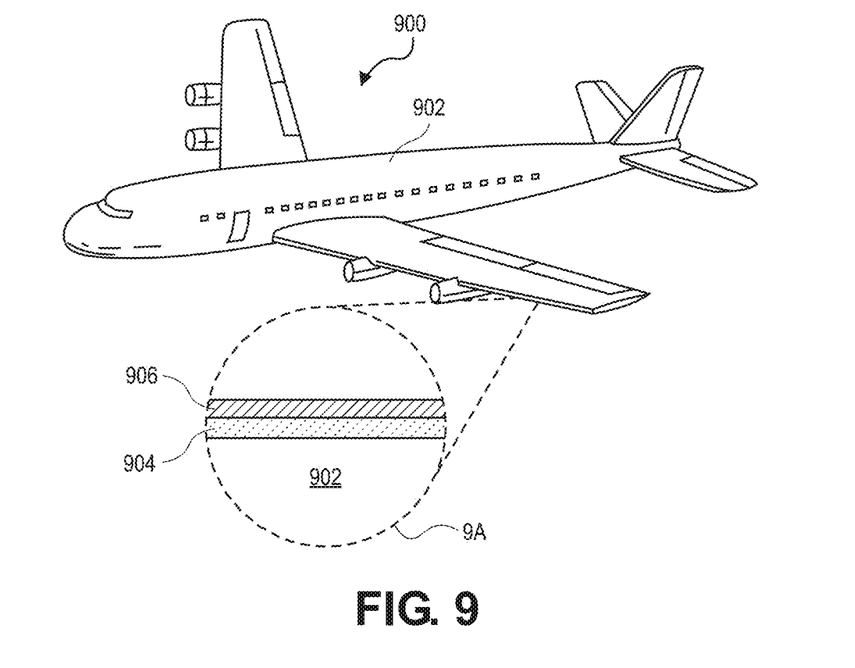
FIG. 9 depicts an application of a structural component including a cold sprayed electrical circuit layer applied to an aerospace vehicle.

FIG. 9 depicts an application of a structural component including a cold sprayed electrical circuit layer applied to an aerospace vehicle. An application of the presently disclosed method is shown on an aerospace vehicle 900, whereby vehicle polymer substrate surface 902 comprised of a fiber-reinforced plastic (FRP) is subjected to the presently disclosed method. Exploded view 9A is shown having vehicle polymer substrate surface 902 with electrochemical insulating layer 904 and cold sprayed electrically conductive layer 906 so as to impart electrical continuity or electrical conductivity, a portion of an electrical circuit, fatigue monitoring circuitry, or one or more integrated wiring harnesses to the surface of the polymer composite material, and/or into a structural component of or a portion of a vehicle. In one example the application of the presently disclosed method is directed to an external surface of the aerospace vehicle 900.

Figure 10:
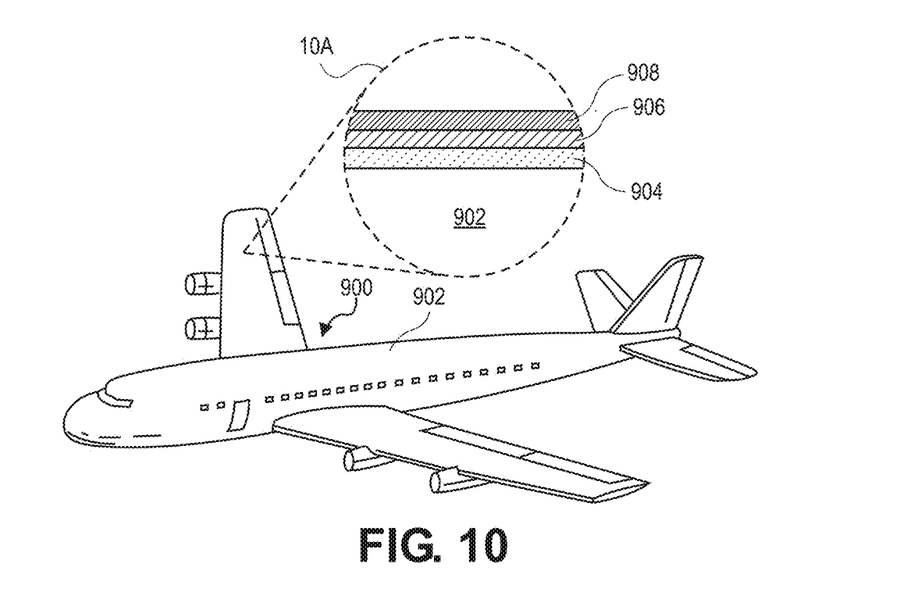
FIG. 10 depicts an application of a structural component including a cold sprayed electrical circuit layer applied to an aerospace vehicle.

FIG. 10 depicts an application of a structural component including a cold sprayed electrical circuit layer applied to an aerospace vehicle. An additional application of the presently disclosed method is shown on an aerospace vehicle 900, whereby vehicle polymer substrate surface 902 comprised of FRP is subjected to the presently disclosed method. Exploded view 10A is shown having vehicle polymer substrate surface 902 with electrochemical insulating layer 904 and cold sprayed electrically conductive layer 906 and an additional coating layer 908 so as to impart electrical continuity or electrical conductivity, a portion of an electrical circuit, fatigue monitoring circuitry, or one or more integrated wiring harnesses to the surface of the polymer composite material, and/or into a structural component of or a portion of a vehicle.

Figure 11:
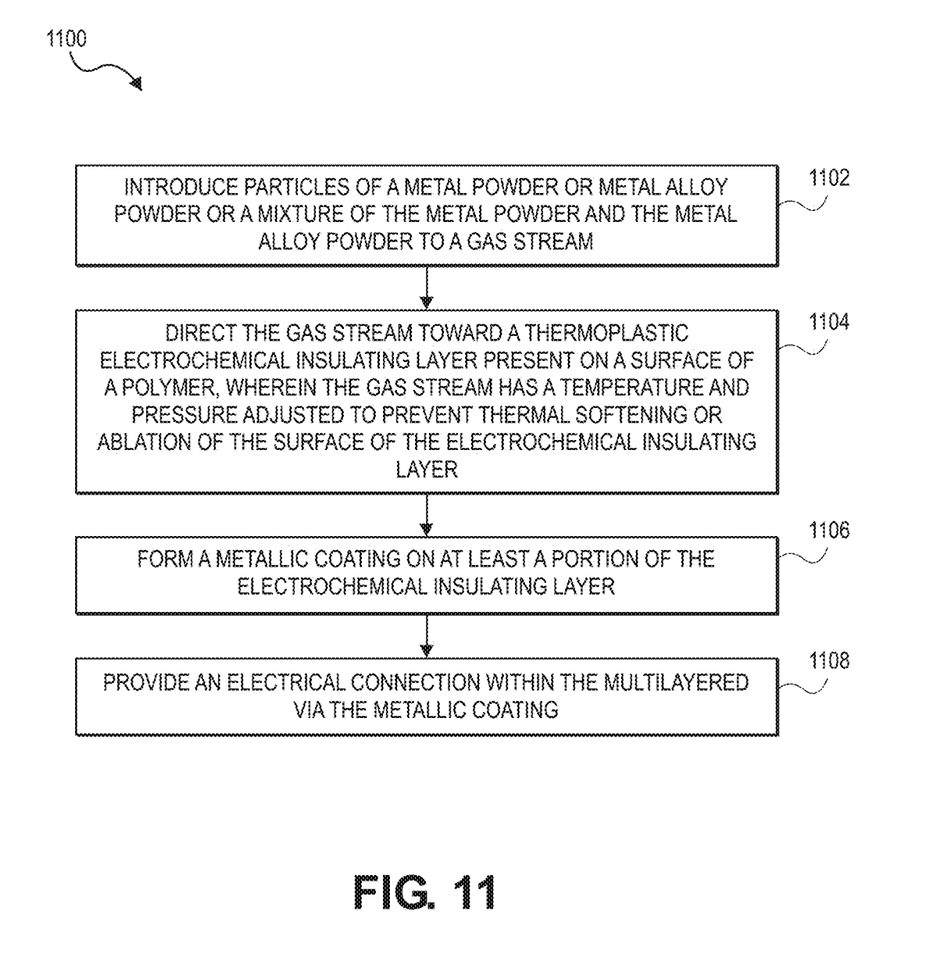
FIG. 11 is a flowchart illustrating a method of providing an electrical connection within a multilayered composite article, in accordance with the present disclosure.

FIG. 11 is a flowchart illustrating a method of providing an electrical connection within a multilayered composite article, in accordance with the present disclosure. A method of providing an electrical connection within a multilayered composite article 1100 includes a step to introduce particles of a metal powder or metal alloy powder or a mixture of the metal powder and the metal alloy powder to a gas stream 1102 followed by directing the gas stream toward a thermoplastic electrochemical insulating layer present on a surface of a polymer, wherein the gas stream has a temperature and pressure adjusted to prevent thermal softening or ablation of the surface of the electrochemical insulating layer 1104. In some aspects the gas stream is directed toward the thermoplastic electrochemical insulating layer according to a specific pattern. In certain aspects the thermoplastic electrochemical insulating layer comprises poly-ether-ether-ketone (PEEK), poly-ether-ketone-ketone (PEKK), or a combination thereof. The temperature of the gas stream in the method of providing an electrical connection within a multilayered composite article 1100 may be between 100° C. and 500° C. and the pressure of the gas stream is between 100 psi and 400 psi. Next, the method of providing an electrical connection within a multilayered composite article 1100 includes a step to form a metallic coating on at least a portion of the electrochemical insulating layer 1106, and to provide an electrical connection within the multilayered via the metallic coating 1108. The metallic coating provided in the method of providing an electrical connection within a multilayered composite article 1100 includes one or more non-continuous segments, wherein the one or more non-continuous segments are not in lateral contact with one another. The deposition or patterning of the metallic coating may be accomplished manually or automatically, and further by computer-controlled patterning or masking techniques known to those skilled in the art.

The preceding description of various aspect(s) is merely exemplary in nature and is in no way intended to limit the disclosure, its application, or uses.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

As used throughout this disclosure, ranges are used as shorthand for describing each and every value that is within the range. It should be appreciated and understood that the description in a range format is merely for convenience and brevity, and should not be construed as an inflexible limitation on the scope of any examples or implementations disclosed herein. Accordingly, the disclosed range should be construed to have specifically disclosed all the possible subranges as well as individual numerical values within that range. As such, any value within the range can be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight of total solids. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that can be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

We claim:

1. A cold sprayed metal coated article comprising:
a polymeric material having at least one surface;
an electrochemical insulating layer on the at least one surface; and
an electrically conductive cold sprayed metal coating present on at least a portion of a surface of the electrochemical insulating layer; and
at least one additional layer, the at least one additional layer sandwiching at least a portion of the electrically conductive cold sprayed metal coating between the at least one additional layer and the electrochemical insulating layer and wherein the at least one additional layer directly contacts a top surface of the electrochemical insulating layer in some portions, the at least one additional layer comprising a polymeric composite comprising an unfilled, nonconductive poly-ether-ether-ketone (PEEK), a poly-ether-ketone-ketone (PEKK), a polyetherimide (PEI), or a combination thereof; and
wherein no portion of the electrically conductive cold sprayed metal coating is exposed to an exterior part of the cold sprayed metal coated article; and
wherein the electrically conductive cold sprayed metal coating is dense and free of microvoids.

2. The cold sprayed metal coated article of claim 1, wherein the polymeric material comprises epoxy, phenolics, polyesters, ureas, melamines, polyamides, polyimides, poly-ether-ether-ketones (PEEK), poly-ether-ketone-ketones (PEKK), polyphthalamides, polyphthalates, polysulfones, polyurethanes, chlorinated polymers, fluorinated polymers, polytetrafluoroethylene, polycarbonates, liquid crystal polymers, partially crystalline aromatic polyesters, or modified versions thereof containing one or more fillers or reinforcement materials comprising carbon, carbon nanotubes, graphite, carbon fibers, graphite fibers, fiberglass, glass fibers, metals, metal alloys, metalized fibers or metal coated glass fibers.

3. The cold sprayed metal coated article of claim 1, wherein the electrochemical insulating layer comprises a thermoplastic.

4. The cold sprayed metal coated article of claim 3, wherein the electrochemical insulating layer comprises poly-ether-ether-ketones (PEEK), poly-ether-ketone-ketones (PEKK), or a combination thereof.

5. The cold sprayed metal coated article of claim 1, wherein the electrically conductive cold sprayed metal coating is selected from silver, gold, aluminum, cobalt, chromium, copper, iron, nickel, molybdenum, palladium, platinum, rhodium, ruthenium, tin, titanium, tungsten, zinc, zirconium, or alloys thereof.

6. The cold sprayed metal coated article of claim 1, wherein the electrically conductive cold sprayed metal coating is completely encapsulated between the electrochemical insulating layer and the additional layer.

7. The cold sprayed metal coated article of claim 1, wherein a deposition pattern of the electrically conductive cold sprayed metal coating forms at least a portion of a resistive heater.

8. The cold sprayed metal coated article of claim 1, wherein a deposition pattern of the electrically conductive cold sprayed metal coating forms at least a portion of an electrical circuit.

9. The cold sprayed metal coated article of claim 1, wherein the polymeric material is a component or part of an aerospace vehicle.

10. The cold sprayed metal coated article of claim 9, wherein the component or part of an aerospace vehicle is an external surface thereof.

11. The cold sprayed metal coated article of claim 1, wherein the electrically conductive cold sprayed metal coating comprises one or more non-continuous segments, wherein the one or more non-continuous segments are not in lateral contact with one another.

12. The cold sprayed metal coated article of claim 1, wherein the additional layer is multilayered and further comprises a different metal than the electrically conductive cold sprayed metal coating.

13. The cold sprayed metal coated article of claim 1, wherein the at least one additional layer is multilayered and further comprises a metal-metal oxide composite, a cemented carbide alloy, or a combination thereof.

14. A structural component, comprising:
a polymeric composite material having at least one surface;
a thermoplastic electrochemical insulating layer on the at least one surface;
an electrical circuit comprising an electrically conductive cold sprayed metal coating present on at least a portion of a surface of the electrochemical insulating layer; and
at least one additional layer, the at least one additional layer encapsulating at least a portion of the electrically conductive cold sprayed metal coating between the at least one additional layer and the electrochemical insulating layer and wherein the at least one additional layer directly contacts a top surface of the electrochemical insulating layer in some portions, the at least one additional layer comprising a polymeric composite comprising an unfilled, nonconductive poly-ether-ether-ketone (PEEK), a poly-ether-ketone-ketone (PEKK), a polyetherimide (PEI), or a combination thereof, wherein:
the electrically conductive cold sprayed metal coating comprises one or more non-continuous segments, wherein the one or more non-continuous segments are not in lateral contact with one another; and
no portion of the electrical circuit is exposed to an exterior part of the structural component; and
wherein the electrically conductive cold sprayed metal coating is dense and free of microvoids.

15. The structural component of claim 14, wherein an electrical resistivity value of the electrically conductive cold sprayed metal coating changes when the structural component undergoes flexion.

16. The structural component of claim 14, wherein the structural component is a part of an aerospace vehicle.

17. The structural component of claim 14, wherein the electrically conductive cold sprayed metal coating is selected from silver, gold, aluminum, cobalt, chromium, copper, iron, nickel, molybdenum, palladium, platinum, rhodium, ruthenium, tin, titanium, tungsten, zinc, zirconium, or alloys thereof.

18. The structural component of claim 14, wherein the additional layer is multilayered and further comprises a different metal than the electrical circuit.

19. A method of providing an electrical connection within a multilayered composite article, the method comprising:
  introducing particles of a metal powder or metal alloy powder or a mixture of the metal powder and the metal alloy powder to a gas stream;
  directing the gas stream toward a thermoplastic electrochemical insulating layer present on a surface of a polymeric material, wherein the gas stream has a temperature and pressure adjusted to prevent thermal softening or ablation of the surface of the thermoplastic electrochemical insulating layer;
  forming an electrically conductive cold sprayed metal coating on at least a portion of the thermoplastic electrochemical insulating layer;
  providing an electrical connection within the multilayered composite article via the electrically conductive cold sprayed metal coating; and
  forming at least one additional layer the at least one additional layer sandwiching at least a portion of the electrically conductive cold sprayed metal coating between the at least one additional layer and the thermoplastic electrochemical insulating layer and wherein the at least one additional layer directly contacts a top surface of the thermoplastic electrochemical insulating layer in some portions, the at least one additional layer comprising an unfilled, nonconductive polymeric composite comprising a poly-ether-ether-ketone (PEEK), a poly-ether-ketone-ketone (PEKK), a polyetherimide (PEI), or a combination thereof; and
  wherein no portion of the electrical connection is exposed to an exterior part of the multilayered composite article; and
  wherein the electrically conductive cold sprayed metal coating is dense and free of microvoids.

20. The method of providing an electrical connection within a multilayered composite article of claim 17, wherein the gas stream is directed toward the thermoplastic electrochemical insulating layer according to a specific pattern.

21. The method of providing an electrical connection within a multilayered composite article of claim 17, wherein the temperature of the gas stream is between 100° C. and 500° C. and the pressure of the gas stream is between 100 psi and 400 psi.

22. The method of providing an electrical connection within the multilayered composite article of claim 19, wherein the electrically conductive cold sprayed metal coating comprises one or more non-continuous segments, wherein the one or more non-continuous segments are not in lateral contact with one another.

* * * * *